2,869,525

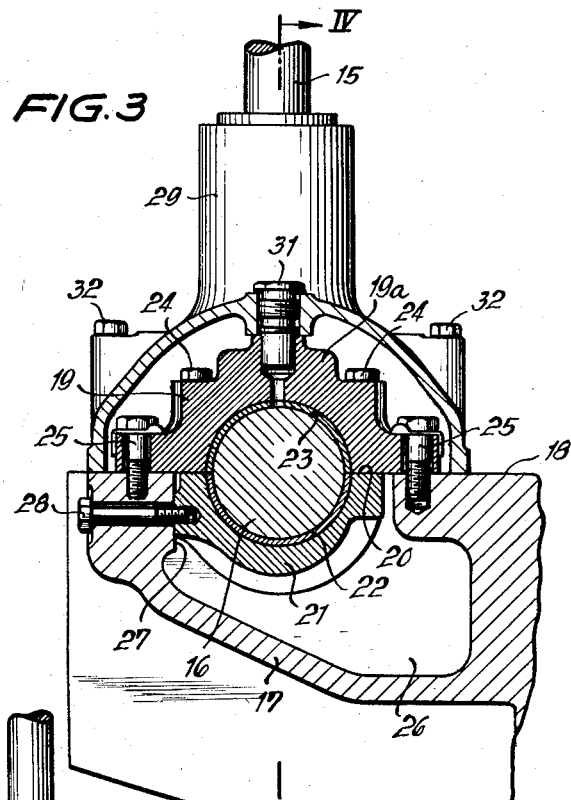
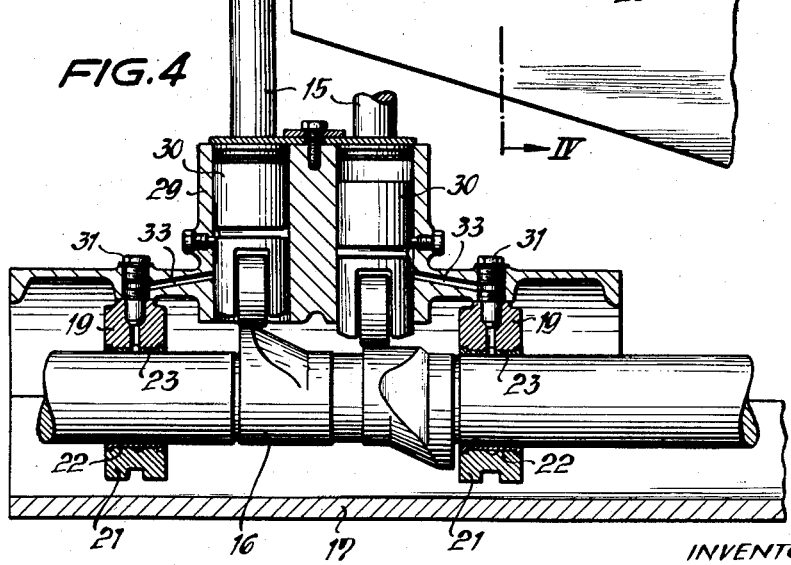

VALVE CONTROLLED INTERNAL COMBUSTION ENGINE

Johann Keylwert, Koln-Kalk, and Karl-Heinz Troniseck, Bruhl-Vochem, Germany, assignors to Klöckner-Humboldt Deutz Aktiengesellschaft, Köln, Germany Application November 19, 1956, Serial No. 623,182

Claims priority, application Germany November 26, 1955

7 Claims. (Cl. 123—90)

The present invention relates to internal combustion engines, and more specifically, concerns a valve controlled internal combustion engine in which the cam shaft for controlling the in- and outlet valves is arranged laterally of the cylinder heads and extends along the engine while the engine block is provided at its upper end with a laterally projecting support for supporting the control members for the valves, the upper surface of said projecting support being provided with a surface arranged flush with the upper surface of the engine block.

With heretofore known internal combustion engines of the above mentioned type, the bearing sockets for journalling the cam shaft in said laterally projecting support are divided along a plane arranged considerably lower than the upper surface of the engine block.

According to another heretofore known internal combustion engine in which the laterally projecting portion serves as air intake manifold, the bearing sockets for the cam shaft are mounted upon the said air intake manifold. In this instance, the cam shaft serves simultaneously for driving the fuel injection pump which is also mounted on said projecting portion.

The above mentioned arrangements have the drawback that they greatly impede the access to the cylinder heads and also make the installation of the various parts more difficult.

It is, therefore, an object of the present invention to provide a valve controlled internal combustion engine of the above mentioned type which will overcome the drawbacks referred to above.

It is another object of this invention to provide an improved construction for a valve controlled internal combustion engine which will not only facilitate the access to the cylinder heads but will also greatly facilitate the assembly of the engine parts.

These and other objects and advantages of the invention will appear more clearly from the following specification in connection with the accompanying drawings, in which:

Fig. 3 shows on a somewhat larger scale than that of Fig. 1 how the cam shaft is journalled.

Fig. 4 represents a section through a portion of the cam shaft, said section being taken along the line IV—IV of Fig. 3.

The essence of the invention consists primarily in that the bearing sockets for the cam shaft are divided along a plane which is flush with the upper surface of the projecting support and with the upper surface of the engine block which last mentioned surface serves as reference surface. This arrangement considerably simplifies the production and assembly of the engine while considerably reducing the production costs and allowing a precise assembly in a minimum of time. Furthermore, the bearing sockets can in this way be easily made exchangeable.

Figure 1:
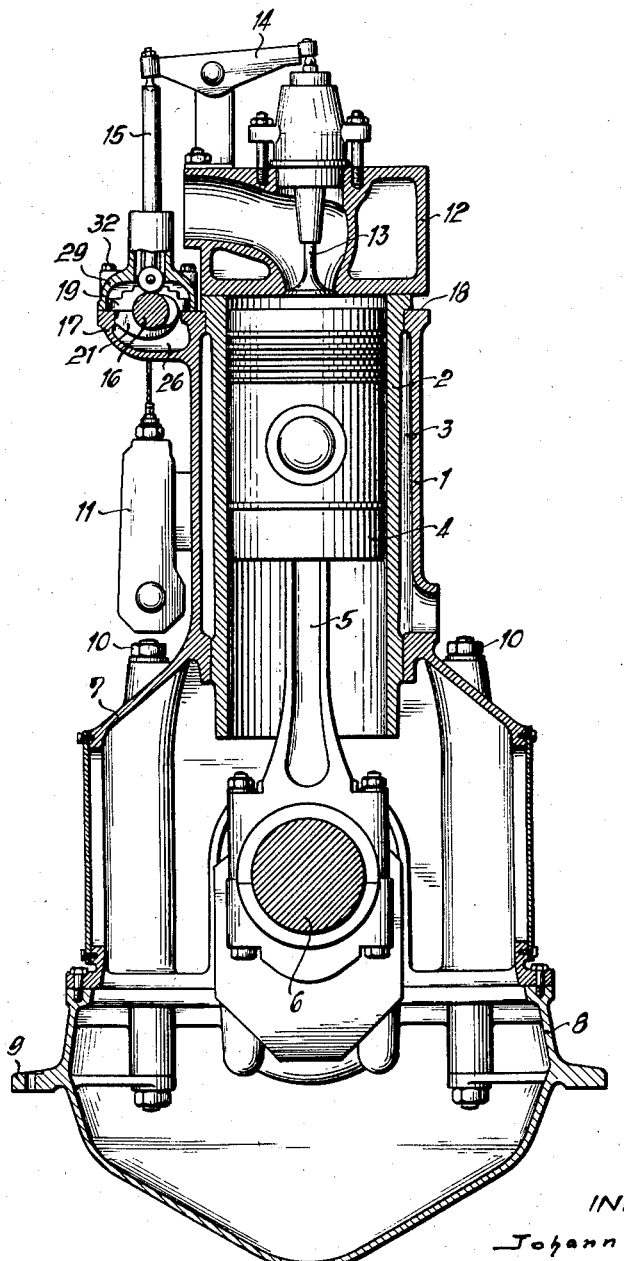
Fig. 1 is a vertical cross section through a valve controlled internal combustion engine according to the invention, said section passing through the longitudinal central axis of one of the cylinders.
Figure 2:
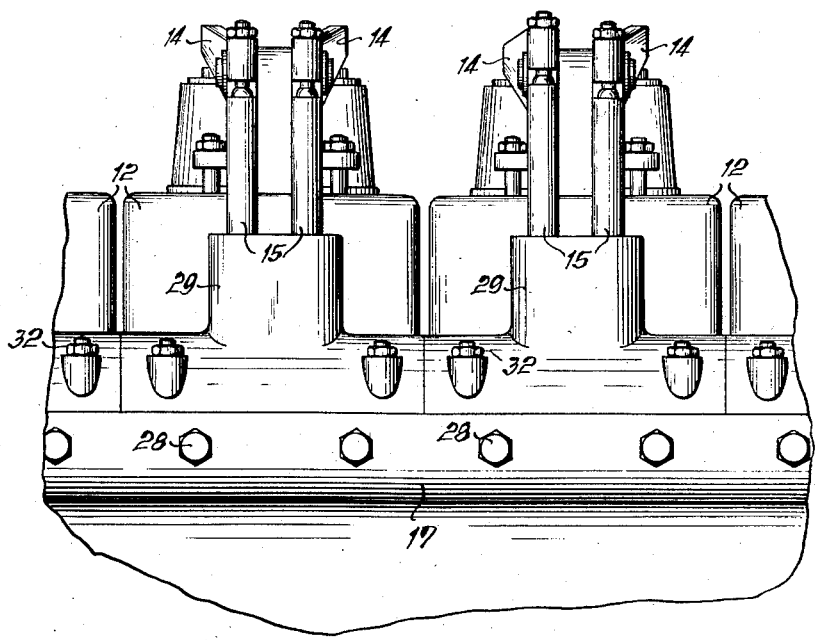
Fig. 2 illustrates on a slightly larger scale than Fig. 1 a side view of the upper part of the engine of Fig. 1 as seen in the direction of the arrow A.

Referring now to the drawings in detail, the engine shown therein is an engine with in line cylinders, as shown in Fig. 2. As will be evident from Fig. 1, the cylinder block 1 has mounted therein bushings or linings 2 forming the cylinders proper. The wall of the engine block 1 confines with the linings 2 a cooling jacket 3 for cooling the cylinders. The engine furthermore comprises pistons 4 (one only being shown) which through connecting rods 5 work upon a crank shaft 6 rotatably journalled in the crank casing 7 of the engine. The bottom portion of the crank case 7 is closed by the oil pan 8 which is provided with laterally projecting supporting parts 9 so that the oil pan serves as base plate. The pan 8 is connected with the crank casing 7 by bolts 10. The engine illustrated in the drawing represents a diesel engine and, for this reason, is provided with a fuel injection pump 11 arranged laterally of the row of cylinders. The upper ends of the cylinders are closed by the cylinder head 12 mounted thereon. The cylinder head 12 supports the inlet and outlet valves 13 which are designed as suspension valves. These valves are controlled by a cam shaft 16 through the intervention of rocker arms 14 and push rods 15. The cam shaft 16 is arranged outside the engine block laterally of the cylinder head 12 and extends along the engine.

At the level of the upper end of the cylinders, the cylinder block is provided with a projecting support 17 for supporting the cam shaft and the control members for the inlet and outlet valves. As will be evident from Fig. 1, the upper horizontal surface of the projecting support is flush with the upper horizontal surface 18 of the engine block, which last mentioned surface may be designated as reference surface. Bearing sockets 19 for the cam shaft 16 are inserted from above into the projecting support 17. The bearing sockets are divided so that their dividing plane 20 is located in the plane of the reference surface 18 and the upper horizontal surface of the projecting support. The division of the bearing sockets is necessary for purposes of installing said sockets. The lower portion of the bearing sockets is designated with the reference numeral 21 and together with the upper portion 19a and the sections 22 and 23 of the bearing bushing forms the journal for the cam shaft. The portions 19a and 21 of the bearing sockets are firmly connected with each other by bolts 24. In addition thereto, bolts 25 are provided for connecting the bearing sockets to the projecting support 17. The projecting support 17 has the shape of a trough 26. As will be seen, particularly from Fig. 3, this trough is provided with a relatively small vertical surface 27 against which the bearing sockets 19 are pulled by means of screws 28. The lateral bearing surface 27 for the bearing sockets 19 in combination with the location of the dividing plane of said sockets in the plane of the reference surface 18 secures the proper positioning of the cam shaft and the proper operation of the control elements controlled by the cam shaft.

The bearing sockets 19, 21 are covered by separate casing members 29 which serve as guiding means for the roller supporting valve tappet 30. Each cylinder of the engine is provided with separate casing members 29 which by means of fitting screws 31 inserted into the bearing sockets from above are properly located with regard to the longitudinal direction of said casing members. The casing members 29 are firmly connected with the laterally projecting portion 17 by screws 32. The arrangement of the casing members 29 as set forth above, yields a particularly simple construction for the guiding of the rollers and tappets.

The lubrication for the journalling of the cam shaft is effected through the intervention of the guiding means for the valve tappets and through the hollow fitting or indexing screws 31. To this end, oil passages 33 are provided in the casing members 29 which cooperate with a control groove 34 in the roller tappets 30.

It is, of course, understood that the present invention is, be no means, limited to the particular construction shown in the drawings but also comprises any modifications within the scope of the appended claims.

What we claim is:

1. An internal combustion engine with inlet and outlet valves for controlling the same, which comprises in combination: a cylinder block having a machined upper surface serving as reference surface, a plurality of bushings resting on said reference surface and forming a plurality of serially arranged cylinders, said cylinder block being provided with laterally projecting supporting means having the upper surface thereof machined flush with said reference surface, a cam shaft, a plurality of supporting sockets carried by said projecting supporting means and supporting said cam shaft, said supporting sockets being divided along a surface flush with said reference plane, and valve actuating means operable by said cam shaft for actuating said valves.

2. An internal combustion engine with inlet and outlet valves for controlling the same, which comprises in combination: a cylinder block having a machined upper surface serving as reference surface, a plurality of bushings resting on said reference surface and forming a plurality of serially arranged cylinders, said cylinder block being provided with laterally projecting supporting means having the upper surface thereof machined flush with said reference surface, said laterally projecting supporting means forming a trough extending along said cylinder block and being provided at the inside of its outermost wall with a machined abutment surface spaced from said cylinder block for engagement with a correspondingly machined surface of said sockets, a cam shaft, a plurality of supporting sockets carried by said projecting supporting means and supporting said cam shaft, said supporting sockets being divided along a surface flush with said reference plane, said machined abutment surface being perpendicular to the plane of said reference surface, connecting means pressing said sockets against said abutment surface, and valve actuating means operable by said cam shaft for actuating said valves.

3. An internal combustion engine with inlet and outlet valves for controlling the same, which comprises in combination: a cylinder block having a machined upper surface serving as reference surface, a plurality of bushings resting on said reference surface and forming a plurality of serially arranged cylinders, said cylinder block being provided with laterally projecting supporting means having the upper surface thereof machined flush with said reference surface, a cam shaft, a plurality of divided supporting sockets carried by said projecting supporting means and supporting said cam shaft, said supporting sockets being divided along a plane flush with said reference surface and the machined upper surface of said supporting means, valve actuating means including tappet means operable by said cam shaft for actuating said valves, and casing means resting on said machined upper surface of said projecting supporting means and covering up said sockets while being provided with guiding means for said tappet means.

4. An arrangement according to claim 3, in which separate casing means are associated with each cylinder, and in which separating fitting screws are provided for individually securing said casing means in their respective positions.

5. An internal combustion engine with inlet and outlet valves for controlling the same, which comprises in combination: a cylinder block having a machined upper surface serving as reference surface, a plurality of bushings resting on said reference surface and forming a plurality of serially arranged cylinders, said cylinder block being provided with laterally projecting supporting means having the upper surface thereof machined flush with said reference surfaces, a cam shaft having its longitudinal axis located in a plane substantially flush with said reference surface, a plurality of supporting sockets carried by said projecting supports and supporting said cam shaft, said supporting sockets being divided along a plane flush with said reference surface and the machined upper surface of said supporting means, valve actuating means including tappet means operable by said cam shaft for actuating said valve and being provided with lubricant conveying grooves, casing means covering up said socket means and resting on the machined upper surface of said projecting supporting means while being provided with guiding means for said tappet means, and hollow fitting screws securing said casing means at their proper positions and provided with conduit means for conveying lubricant to the guiding means for said tappet means and through the lubricant conveying grooves of the latter to the bearing sockets.

6. An engine according to claim 5, in which said tappet means is provided with a control groove for controlling the supply of lubricant thereto and to said bearing sockets.

7. An engine according to claim 3, in which said supporting means has a machined inner surface substantially perpendicular to its machined upper surface, and in which each of said divided supporting sockets has an upper portion with a machined surface engaging the machined upper surface of said supporting means and has a lower portion with a machined surface engaging the machined inner surface of said supporting means.

References Cited in the file of this patent

FOREIGN PATENTS

| | | |
|---|---|---|
| 859,742 | France | Sept. 16, 1940 |
| 968,182 | France | Apr. 12, 1950 |
| 56,828 | Netherlands | Aug. 15, 1944 |